Aug. 22, 1961     J. V. OLIVEAU     2,996,781

DISCONNECTS

Filed July 29, 1957

INVENTOR.
John V. Oliveau
BY Benj. T. Rauber
ATTORNEY

United States Patent Office 2,996,781
Patented Aug. 22, 1961

2,996,781
DISCONNECTS
John V. Oliveau, Greenwich, Conn., assignor to Aerotec Industries, Inc., a corporation of Connecticut
Filed July 29, 1957, Ser. No. 674,955
3 Claims. (Cl. 24—230)

My present invention relates to a disconnect, that is, to a device to hold two elements together against a separating force up to a limit and to permit their separation when the force exceeds this limit. The disconnect of my invention may be used in a great variety of installations, between cables, parts of aircraft equipment, arming of war heads, triggering of certain mechanisms that must be accomplished on launching and other installations. For example, it may be used as a rear fitting of an aircraft radio antenna so that, in the event that the antenna should become damaged during flight or combat, the drag of the wire as it whips back of the aircraft will cause it to break away free from the aircraft, thereby eliminating the possible hazard caused by a loose antenna wire and its possible tangling with control surfaces etc.

In my invention I provide two separable disconnect elements, one of which may be inserted into and locked in the other. These elements, when thus assembled, are locked together by intergaging surfaces held from separation by a locking element, spring pressed into locking position to hold the intergaging surfaces from disengagement or relative movement. However, when a separating pull of sufficient force is applied to overcome the spring of the locking element and move it from locking position, one of the engaging surfaces may move transversely of the direction of pull to permit relative movement of the disconnect elements in opposite directions and thereby separation of the disconnect elements. To assemble the disconnect, one of the disconnect elements may be inserted into the other, whereupon the locking element will be pressed by the spring into locking position.

Figure 1:
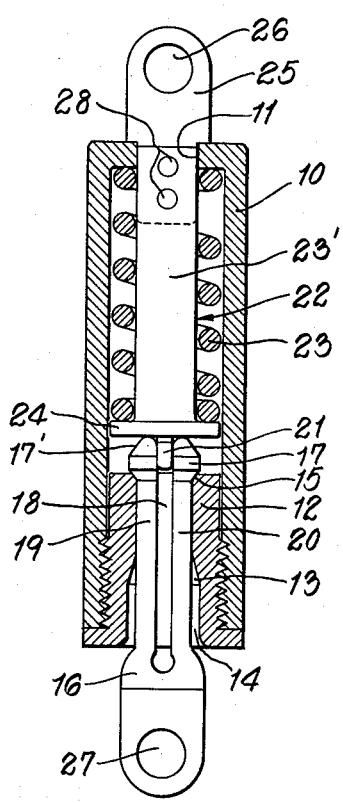
Figure 2:
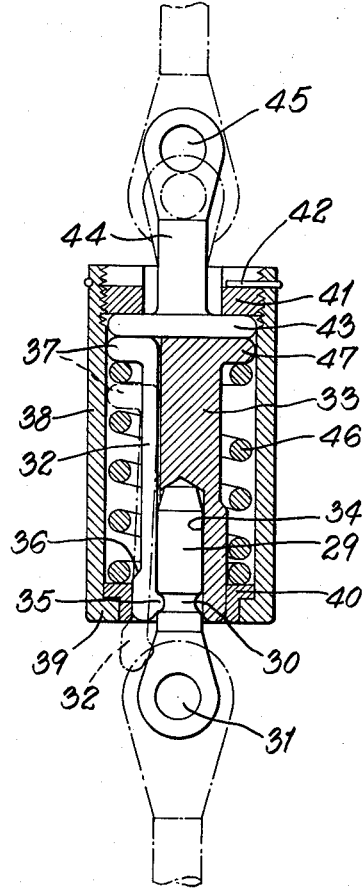
Figure 3:
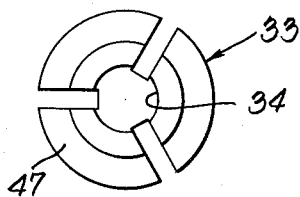

The disconnect elements and the locking element may be of various forms. Embodiments are illustrated by way of example in the accompanying drawings, in which:

FIG. 1 is a vertical section of an assembled disconnect embodying one form of my invention, FIG. 2 is a vertical section of an assembled disconnect embodying another form of the invention, and FIG. 3 is an inverted plan of a spacing element for certain elements of the disconnect.

In the embodiment of FIG. 1 the disconnect comprises one disconnect element 10 of tubular form closed at its upper end except for an opening 11 and having inserted and fixed in its lower end an insert 12 having a central passage 13 co-axial with the opening 11. The passage 13 is flared at its lower end as at 14 and is beveled outwardly at its upper end as at 15.

A lower disconnect element 16 is insertable through the passage 13 as shown in FIG. 1 until a head 17 has passed above the upper end of the passage. The head 17 and upper part of the disconnect is bifurcated as at 18 to permit the two legs 19 and 20 of the disconnect formed by the bifurcation to spring inwardly to contract the head so that it may pass through the passage. After having passed through the passage to a position above the passage, the legs 19 and 20 spring outwardly to the position shown in which the head 17 is above the insert 12. The upper end of the head 17 is chamfered at 17' so that as it is pushed into the passage it will spring the legs inwardly and the lower end is beveled to rest on the bevel 15 of the passage to cause the legs and head and legs to be sprung inwardly.

When the disconnect 16 is inserted into the disconnect 10 as shown in FIG. 1 the head 17 and legs 19 and 20 are prevented from moving inwardly by means of the tip 21 of a locking element 22 which is pressed downwardly by a coil spring 23 encircling a stem 23' of the locking element and confined between a flange 24 of the locking element and the upper end of the disconnect element 10. The upper end of the stem 23' projects through the opening in the upper end of the disconnect element 10 and has secured to it a stop element 25 the lower end of which rests on top of the element 10 to prevent movement of the locking element below the position shown in FIG. 1. The stop element 25 has an opening 26 by which it may be secured to one of the parts to be secured together and similarly the lower end of the element 16 has an opening 27 by which it may be secured to the other part.

When a force is applied to the elements 25 and 16 tending to pull them apart the locking element prevents the legs 19 and 20 from being pressed toward each other and the engagement of the head 15 with the upper end of the insert 12 prevents the separation of the disconnect elements. However, when this separating force is sufficient to compress the spring 23 the locking element is drawn upwardly until the tip 21 of the locking element is above the head 15 and the legs 19 and 20 may bend toward each other under the resultant inward force of the bevel edges of the head and the upper end of the passage 13. The lower disconnect then passes out of the passage 13 and the disconnect is separated.

After the disconnect elements have been separated the spring 23 presses the locking element downwardly until the stop 25 rests on the upper end of the element 10. To connect the disconnect the head 15 is inserted through the flared part 14 into the passage 13, pressing the legs 19 and 20 inwardly. As the head is pushed upwardly through the upper end of the passage it pushes upwardly the tip 21 and the flange 24 againts the pressure of the spring 23 until the head is above the passage 13 whereupon the legs 19 and 20 spring apart and the spring 23 pushes the locking element downwardly to place the tip 21 between the separated parts of the head locking the disconnect elements together.

The disconnect element 10 forms a shell for the various elements. The insert 12 is screw threaded into the lower end of this shell. To mount the spring 23 and the locking element in the shell the insert is unscrewed and removed, the spring inserted, the locking element is inserted and pushed upwardly until the end of the stem 23' projects through the opening 11 so that the stop element 25 may be secured to it by rivets or pins 28. The insert is then screwed into the lower end of the shell.

In the embodiment shown in FIG. 2 the lower disconnect element comprises a cylindrical jack 29 beveled or chamfered at its upper end and having a circumferential groove 30 at a distance below its upper end. The lower end of the disconnect element is provided with an opening 31 to form an eyelet for attachment to an element to be held, such as the end of a cable.

The upper disconnect element, into which the lower disconnect element is received, comprises a number of legs 32, three for example, set in radial grooves or slots in a central core 33 as shown in FIGS. 2 and 3. The core 33 is provided with a recess 34 extending axially upwardly from its lower end to receive the lower disconnect element. The lower end of each of the legs 32 is inturned to form projections 35 to enter the groove 30 of the lower disconnect and the outer edge of each leg is recessed as at 36 to an extent equal to the transverse or radial dimension of the projection 35 and immediately above these projections. The upper end of each leg is bent outwardly, preferably at a right angle, to form an outwardly extending arm 37.

The legs 32 are held in the radial slots of the core by a locking element which comprises a cylindrical shell 38 the inner surface of which contacts the outer ends of the arms 37. The lower end of the shell is inturned to form an inturned flange 39 in which is mounted a flanged ring 40 the inner periphery of which holds the lower ends of the legs 32 inwardly to lock the projections 35 in the groove 30 when the lower disconnect is in the position shown in full lines in FIG. 2. An annular disc 41 is screwed into the upper end of the shell and locked from unscrewing by a spring clip 42. A flat disc 43 is positioned immediately below the disc 41 and has an integral stem 44 projecting through the annular disc and provided with an eyelet 45 for attachment to an element to be secured. A spring 46 confined between the ring 40 and the arms 37 and an outward flange 47 of the core 33 serves to hold resiliently the legs 32, core 33 and disc 43 in the position shown in full lines in FIG. 2.

When the disconnect is assembled as shown in full lines in FIG. 2 the disconnect elements cannot be pulled apart until a separating force is applied sufficient to compress the spring 46 inasmuch as the projections of the upper disconnect are locked in the groove by the ring 40. When a separating force sufficient to compress the spring 46 to the position shown in broken lines in FIG. 2, is applied, the recessed outer edge of each leg is below the ring 40 and the legs may swing outwardly until the projections 35 are outside of the groove and the lower disconnect element may be withdrawn from the upper element. When the disconnect is to be assembled the stem 44 and disc 43 are pushed inwardly in the shell 38 compressing the spring 46 until the recessed part 36 is below the ring 40 whereupon the lower disconnect element 29 may be inserted, the beveled end serving to aid in pushing the legs outwardly.

In assembling the upper disconnect element, the ring 40 is inserted through the upper opening of the shell, the spring 46 is then inserted then the disconnect legs 32 and core 33, then the disc 43 and finally the closing annular disc 41.

Having described my invention, what I claim is:

1. A disconnect which comprises a shell having an open passage extending from one end of said shell to a distance from the opposite end, said passage being of smaller diameter than the inner diameter of the shell, said shell forming one disconnect element, a second disconnect element having a portion to extend through said passage and a head of larger diameter than that of said passage to be positioned in said shell beyond the inner end of said passage, said head and portion being bifurcated to form a pair of spaced parallel legs that may be sprung together to reduce the diameter of said head sufficiently to pass it through said passage, said shell having an opening in the end opposite said passage, a locking means in said shell having a tip insertable and slidable longitudinally between said legs to prevent the springing together of said legs and said head and thus prevent the withdrawal of said second disconnect, and a spring biasing said locking means to position said tip between said legs, said locking means having a stem extending through said opening, whereby said locking means may be moved against the force of said spring to withdraw said tip entirely from said head to permit said head to be withdrawn through said passage.

2. The disconnect of claim 1 in which said locking means has a flange projecting radially outwardly at the inner end of said stem and in which said spring is a coiled spring about said stem and confined between said flange and the opposite end of the shell.

3. The disconnect of claim 2 in which said head is chamfered at its upper and lower ends to facilitate insertion into, and withdrawal from, said passage.

References Cited in the file of this patent

UNITED STATES PATENTS

| | | |
|---|---|---|
| 1,091,449 | Westin | Mar. 24, 1914 |
| 1,414,838 | Street | May 2, 1922 |
| 2,629,156 | Kamens et al. | Feb. 24, 1953 |

FOREIGN PATENTS

| | | |
|---|---|---|
| 40,503 | Austria | Jan. 10, 1910 |
| 709,162 | France | May 11, 1931 |
| 677,438 | Germany | June 26, 1939 |